United States Patent Office 3,063,343
Patented Nov. 13, 1962

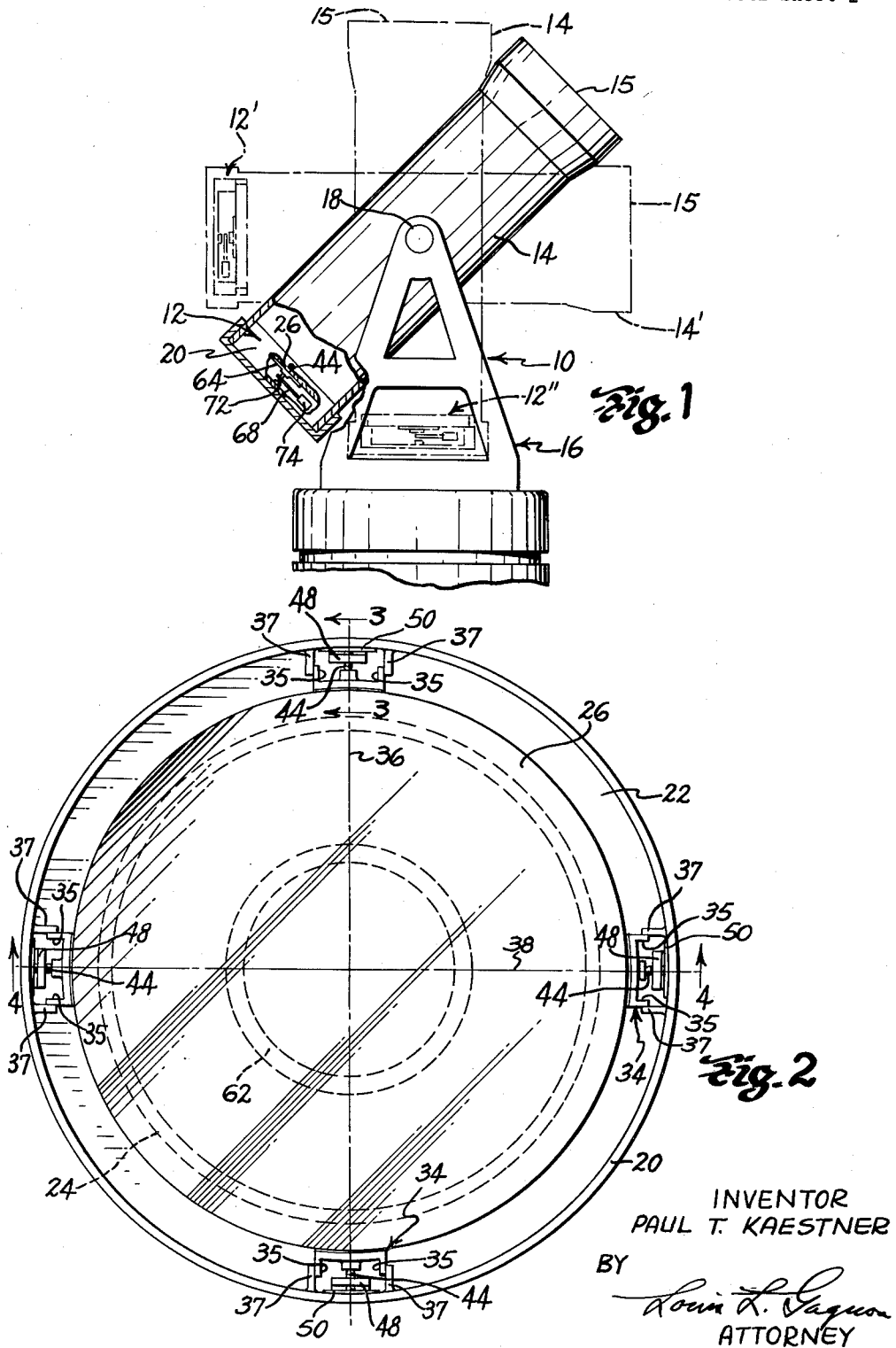

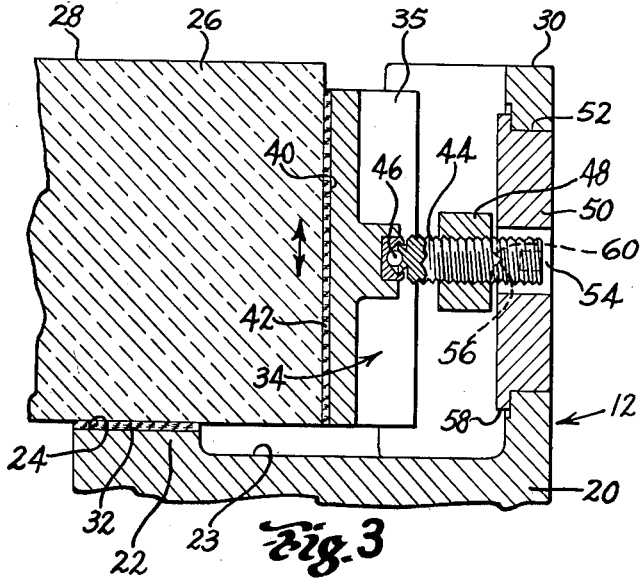
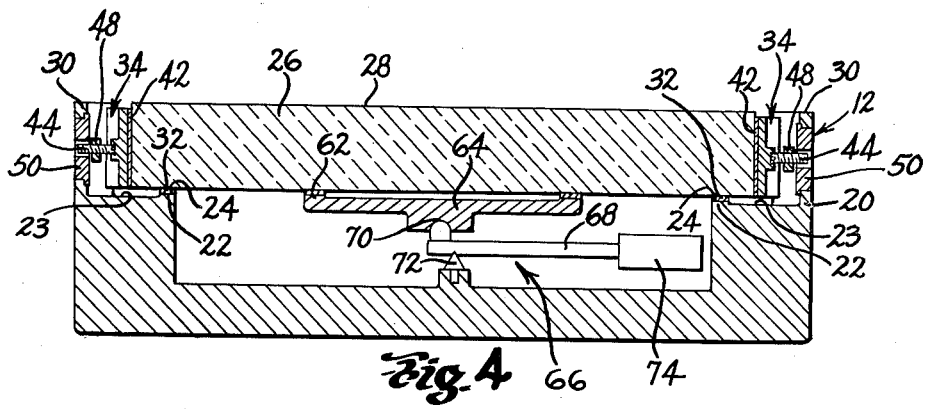
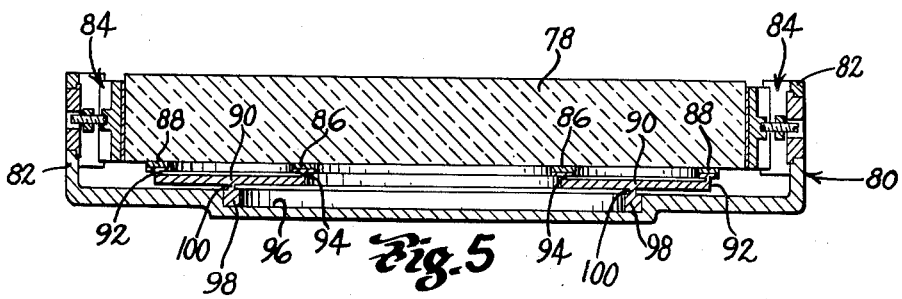

3,063,343
METHOD AND APPARATUS FOR SUPPORTING OPTICAL ELEMENTS
Paul T. Kaestner, Pittsburgh, Pa., assignor to American Optical Company, Southbridge, Mass., a voluntary association of Massachusetts
Filed Oct. 3, 1960, Ser. No. 60,200
14 Claims. (Cl. 88—97)

This invention relates to method and apparatus for supporting optical elements and has particular reference to improved means and method for supporting elements of optical image forming systems or the like which are intended to be adjustable in attitude.

In astronomical instruments, or the like, embodying relatively large image forming mirrors, changes in attitude of the instruments during the establishment of different sighting paths or during tracking operations or the like cause a shifting of the weight of the mirror and thereby introduce tensile and bending stresses in the mirror supporting cells and deflection of the critical surfaces of the mirrors. Mirror deflections which introduce image distortion are, for obvious reasons, objectionable particularly in diffraction limited systems and in large astronomical instruments, for example, angular deflections in the order of fractions of a second of arc are significant.

The problems of optical deterioration caused by the weight of mirrors have been well recognized and various schemes have been devised to reduce mirror surface deformations which result from changes in their attitude. In this respect, such deflections have been reduced in some installations by applying forces to the rear surface of the mirrors at many different preselected points by the use of several counterweighted mechanisms on each of the mirrors which function independently to vary the forces applied at these points in accordance with the attitude of the mirrors. In general, conventional mirror deflection compensating devices have been relatively intricate, complicated, expensive and subject to malfunction and have left much to be desired in this field.

Accordingly, it is a principal object of the present invention to provide improved, simplified and highly efficient means and method for supporting optical elements more particularly of the type intended for use in instrument systems which are adjustable in attitude.

Another object is to provide a mirror cell support embodying means functioning automatically in accordance with the attitude of said support to apply a compensating force to a mirror mounted therein which force acts to oppose the natural forces tending to cause distortion of said mirror.

Another object is to provide means for applying said compensating forces annularly to the rear surfaces of mirrors mounted in supporting cells at predetermined radial distances from the axes of said mirrors which distances are established in accordance with the known diameters of said mirrors.

Another object is to provide means for accomplishing the above-compensating action with a single counterweighted arrangement functioning to respond universally to all directions of elevation and azimuth adjustment of the mirror supporting cell.

Another object is to provide, in combination with the above, improved means forming a part of the mirror supporting cell for preventing rotational and lateral misalignment of the mirror in the cell without introducing frictional constraint at the mirror edges.

Another object is to provide, in a mirror cell of the above character, a pair of spaced concentric annular supporting members constructed and arranged as beam type balancing means adapted to compensate for shifting of the weight of a mirror in said cell during attitude changes thereof by sharing said weight substantially evenly through the action of flexures connecting said members to said cell.

A further object is to provide mirror supporting means of the above character which is unique in its simplicity of construction, freedom for malfunction and effectiveness of operation.

Other objects and advantages of the invention will become apparent from the following description when taken in conjunction with the accompanying drawings in which:

FIG. 1 is a partially cross-sectioned diagrammatic illustration of a telescope installation showing one form of the invention in a position of use therein;

FIG. 2 is a plan view of a preferred form of the invention;

FIG. 3 is an enlarged fragmentary cross-sectional view taken along line 3—3 of FIG. 2 looking in the direction indicated by the arrows;

FIG. 4 is a cross-sectional view taken on line 4—4 of FIG. 2 looking in the direction indicated by the arrows; and FIG. 5 is a cross-sectional view similar to FIG. 4 illustrating a modification of the invention.

Referring more particularly to the drawings wherein like characters of reference designate like parts throughout the several views, there is shown in FIG. 1 a diagrammatic illustration of a telescope installation 10 having an optical mirror supporting cell 12 therein of the type embodying the invention.

It is pointed ou that the invention relates more particularly to the mirror cell construction and it will become apparent as this description progresses that the installation 10 has been given only for purposes of illustrating various conditions of attitude which optical mirrors are required to assume when used in astronomical instruments or the like.

In establishing different sight lines or while tracking objects or the like, telescopic instruments are adjusted in elevation and azimuth to align their optical axes with the object or target. In so doing, the various optical elements of the instrument systems which, in most cases, are supported within a tubular part similar to the part 14 (FIG. 1), are subject to various changes in attitude ranging from a position wherein their general planes become substantially vertical when the part 14 is rendered axially horizontal as represented by the dot-dash outline 14' to a position where their general planes become substantially horizontal when the par 14 is rendered axially vertical as represented by the dot-dash outline 14".

In telescope installations, azimuth and elevation adjustments are effected through the use of various types of universal mounts, the simplest of which might be a trunnion cradle 16 such as shown in FIG. 1 to which the tubular part 14 of the installation is swivel mounted by trunnions 18 which permit adjustment of the part 14 shown in elevation. Azimuth adjustments of the part 14 are accomplished by rotation of the trunnion cradle 16 about its vertical axis.

In order to minimize mirror deflections in instrument systems of the above character which are caused by shifting of the weight of the mirrors during attitude changes thereof, the present invention provides, as a part of the cell 12, means which functions automatically in accordance with the attitude of the cell to apply compensating forces to the rear surface of a mirror mounted therein. These compensating forces act to oppose the natural forces tending to cause deflection or distortion of the mirror.

Referring more particularly to FIGS. 2, 3 and 4, it can be seen that the mirror supporting cell 12 comprises a rigid annular main supporting body 20 which is cast or otherwise preferably formed of metal having an inset annular shouldered portion 22 machined or otherwise so formed adjacent its inner edge as to provide an annulus 24 against which the rear surface of the mirror 26 is rested. It can be seen in FIGS. 3 and 4 that the annulus 24 is an upstanding integral part of the shouldered portion 22 and is formed to a predetermined desired width and height by relieving the intermediate area 23 of the shouldered portion 22. The mirror engaging surface of the annulus 24 is preferably located at such a depth in the body 20 of the cell 12 as to locate the effective surface 28 of the mirror 26 in substantially flush relation with the forward edge 30 of the cell when the said mirror 26 is rested against a relatively thin annular pad 32 or the like which is placed upon the annulus 24. The pad 32 is preferably formed of cork or some such resilient material and is provided to cushion the mirror 26 at its location of engagement with the cell.

In order to align the mirror axially in the cell 12 and to provide means for permanently retaining such an alignment while avoiding frictional constraint between the edges of the mirror and the adjacent inner sides of the body 20, adjustable mounting blocks generally indicated by the reference numeral 34 are provided between the mirror edges and the body 20 at diametrically opposed points along a pair of right angularly related meridians 36 and 38 (see FIG. 2) which extend through the axis of the cell 12.

The blocks 34 are provided with faces 40 (see FIG. 3) which are shaped to conform substantially to the cylindrical shape of the edge of the mirror 26 and are placed against the mirror edge preferably with a relatively thin, resilient pad 42 of cork or similarly characterized material positioned between the mirror edge and the respective faces 40 of the blocks 34 for cushioning purposes.

When the mirror cell 20 with the mirror 26 therein is brought from a vertical position to a horizontal position such as shown in FIG. 1, deflection or distortion of the cell 20 takes place as a result of tensile and binding stresses caused by the weight of the mirror. These cell deflections or distortions cause a small axial displacement of the mirror toward the rear of the cell and when a resilient material such as cork is used to pad the surface of the annulus 24, the axial displacement becomes greater. In order to avoid having frictional forces develop between the edge of the mirror and the inside of the cell body 20 which forces, if allowed to exist, would cause deflection or distortion of the critical mirror surface adjacent its edges, the blocks 34 are pivot mounted to the body 20. Referring more particularly to FIG. 3, wherein one of the block pivot mounts is shown in detail, it can be seen that the pivot mount embodies a threaded stud 44 which is attached at one end to the block 34 by a ball and socket connection 46 and is threaded through a pivot member 48 adjacent its opposite end which is arranged to permit the stud 44 to pivot only in a direction parallel to the axis of the mirror 26. The pivotal arrangement relating to the member 48 embodies an insert 50 which is press fitted into an appropriately machined opening 52 in the side wall of the cell body 20. The insert 50 is provided with a central opening 54 which is somewhat larger than the diameter of the stud 44 and is also provided with a V-groove 56 extending diametrically thereacross (see FIG. 3). A flange 58 is provided on the end of the insert 50 facing the block 34 and is arranged to seat against the inner side wall of the cell body 20 to prevent the insert from pushing through the body 20 when pressure is applied thereto in mounting the mirror 26 as will be described. Also, the insert 50 is so oriented in the body 20 as to direct its V-groove 56 along a line normal to the direction of the axis of the mirror. Fitting within the V-groove 56 is a V-shaped protrusion 60 on the adjacent facing end of the member 48 (see FIG. 3).

By reaching through the opening 54 in the insert 50, the stud 44 is rendered accessible from outside the cell 12 and is thereby threaded into the member 48 which action forces the block 34 and the member 48 apart from each other urging the V-shaped protrusion firmly into the groove 56. A desired holding force is applied to the mirror 26 by the above adjustment on each of the diametrically opposed blocks 34 and coaxial alignment of the mirror 26 in the cell 12 is accomplished by threading the studs 44 of each diametrically opposed pair of pivot mounts 34 to move the mirror 26 laterally in the direction of one or both of the meridians 36 and 38 as required to center the mirror in the cell 12. It can then be seen that with the mirror 26 edge mounted as just described, the mirror 26 is relatively free to move axially in the cell in response to deflections of the mirror cell 12 or compression of the cushioning pad 42 which might result from forces applied thereto by the weight of the mirror during changes in attitude thereof. Such freedom of movement avoids image distortion by preventing deflections of the mirror's critical surface 28 and affects only the focus of an optical system in which the mirror is used. Compensation for changes in conditions of focus are made in the usual known manner common to telescopic systems or the like. It is pointed out, however, that axial shift of the mirror due to deflections of the cell 12 and/or compression of the pad 42 are very slight and thus the effect on focus in the system is practically negligible.

It should also be understood that the mirror 26 is held firmly against the annulus 24 at all times mainly by its own weight and that under no circumstances in installations of the type relating to this invention is the mirror cell ever oriented to a position wherein the mirror would tend to lift away from said annulus. That is, the light-receiving end 15 of the telescope 14 (FIG. 1) is never depressed below the level indicated by dot-dash outline 14' wherein the mirror cell 12 is disposed vertically as illustrated. Thus, elevational attitude changes in the mirror cell 12 take place only between the two extreme positions shown by the dot-dash outlines in FIG. 1. In order to avoid rotational misalignment of the mirror 26 in the cell 12, the blocks 34 are provided with rearwardly extending side parts 35 which are slidably intimately fitted between similar protrusions 37 formed integral with and upon the inner adjacent wall of the cell body 20.

Referring more particularly to FIG. 4 wherein the mirror 26 and its supporting cell 12 are illustrated as being disposed horizontally, it can be seen that support of the mirror 26 by means of the annulus 24 alone would permit the intermediate or unsupported central portion of the mirror to tend to sag under its own weight and thereby distort its critical surface 28 with the effect of producing image distortion in an optical system embodying such a mirror.

Distortions resulting from the weight of the mirror will vary in magnitude and direction in accordance with the attitude of the mirror. That is, maximum angular deflection of the mirror will occur when it is brought to a horizontal position such as shown in FIG. 1 and 4 and minimum or substantially no deflection will occur when the mirror is brought to a vertical position as illustrated by dot-dash outline 12' in FIG. 1.

It is pointed out that for smaller mirrors, such as for example those less than 24 inches in diameter, the use of the single annular support 24 alone (see FIG. 4) having a diameter approximately 70% of the mirror diameter will usually function to hold the mirror deflections or distortions within tolerable limits by rendering said deflections or distortions substantially equal and opposite in effect inside and outside the annular support 24.

For mirrors over 24 inches in diameter, the angular deflections or distortions resulting from the above-mentioned 70% annular support become excessive for critical applications and for this reason, the invention provides dual annular supports, such as shown in the drawings for the larger mirrors.

In FIGS. 1–4, the second annulus 62 is formed upon one side of a pressure plate 64 and is positioned so as to be concentric with the annulus 24 and is supported against the rear surface of the mirror 26 by means of a counterweighted arrangement 66 which functions to support a portion of the mirror load and to counteract natural forces tending to distort the mirror.

The counterweighted arrangement 66 embodies a lever arm 68 pivotally connected at 70 to the pressure plate 64 by a ball and socket type connection and supported upon a fulcrum 72 which is formed as an integral fixed part of the cell body portion 20. At the end of the lever arm 68, there is provided a counterweight 74 which functions to urge the pressure plate 64 toward the rear surface of the mirror 26. The pressure applied to the mirror by the plate 64 is controlled by proper selection of the dimensions in length of the lever arm, position of the fulcrum and selection of the weight applied at 74.

The pressures applied to the mirror 26 and the relative diameters of the annuli 24 and 62 are selected in accordance with the physical characteristics of the particular mirror which is supported in the cell 12. Some mirrors are made with a hole in the center or the central portion of the mirror is vignetted in which case the deflection of the vignetted portion of the mirror is of no consequence in considering the optical distortion caused by the weight of the mirror. As an example, however, for a mirror of the type illustrated as 26 in the drawings wherein deflections of the critical surface 28 must be minimized throughout its entire area, the outer annulus 24 might be of such diameter as to bear against the mirror at approximately the 85% to 90% mirror diameter zone and the inner annulus of such diameter as to bear against the mirror at approximately the 40% to 45% diameter zone. The diameters of the annuli are taken to the centers of their widths and the widths of the annuli have little significance in the function of the apparatus.

It can now be seen that by applying an upwardly directed force to the rear of the mirror 26 by means of the arrangement of the counterweighted apparatus 66 and pressure plate 64, which is equal and opposite to the natural forces tending to distort the mirror 26 when in a horizontal position such as shown in FIG. 4, deflection of the mirror's critical surface 28 is substantially eliminated or reduced to a negligible amount.

It will be noted that no rotation of the counterweight 74 about the optical axis of the mirror 26 is provided for or required since the compensating action of the counterweight is independent of the attitude of the mirror cell 12. That is, the inner annulus supporting force is the same for a given tilt angle regardless of whether the side of the mirror cell 12 adjacent the counterweight 74 is raised, lowered or the mirror is tilted about an axis parallel to the lever arm 68.

When the mirror cell 12 is positioned vertically as shown by dot-dash outline 12' in FIG. 1, the pull of gravity on the counterweight 74 will be in a direction along the axis of the lever arm 68 and substantially no forces will be exerted on the mirror 26 by the pressure plate 64 while maximum pressure will be exerted when the cell is oriented to a horizontal position such as shown by the outline 12" in FIG. 1 in which case, the pull of gravity on the counterweight 74 will be in a direction normal to the axis of the lever arm 68. At angles of tilt between the two above-mentioned extremes, the direction of the pull of gravity on the counterweight being equiangularly related to the angle of tilt will cause forces varying proportionally in accordance with the tilt angle to be applied by the pressure plate 64.

An alternate construction for a mirror cell is shown in FIG. 5 which operates on the beam balance principle.

In FIG. 5 the mirror 78 is mounted in a cell 80 having a body portion 82 similar to the body portion 20 of the cell 12. The mirror is supported at its edges by pivotally mounted blocks 84 which are similar in construction and function to the above-described blocks 34. The rear surface of the mirror 78 is supported upon inner and outer spaced annuli 86 and 88 respectively which are, in turn, interconnected by a relatively rigid balancing section 90 through flexures 92 and 94 which are in the form of web-like sections machined to a relatively thin cross-section.

The cell 80 is provided with a circular recessed portion 96 in which is press fitted an annular support 98 for the beam balance arrangement. The support 98 is formed as an integral part of the members 86, 88 and 90 and is interconnected therewith by a web-like flexure 100 joined to the balancing section 90 substantially midway between the annuli 86 and 88. The annuli 86 and 88 are of such precontrolled diameters as to each support such a portion of the weight of the mirror 78 as to substantially prevent deflection of the mirror's critical surface when in a horizontal position such as illustrated. The forces applied to each annulus by the weight of the mirror are balanced against each other through the action of the beam balance structure and the proportion of weight applied to the annuli at different attitudes of the mirror remains unchanged since, through the action of the flexures 92, 94 and 100, the surfaces defined by the two annuli will remain coplanar at all times. This will result in a minimum of mirror deflection.

From the foregoing, it can be seen that simple efficient and economical means and method have been provided for accomplishing all of the objects and advantages of the invention as expressed in the accompanying claims and the invention is not to be limited to the exact matters shown and described as only the preferred matters have been given by way of illustration.

Having described my invention, I claim:

1. A support for an optical element comprising a main body part, a pair of concentrically related annuli of different diameters selected in accordance with the size of said optical element interconnected with said body part and against both of which one side of said optical element is rested in substantially coaxial relation with said annuli, means engaging the edge of said optical element for restraining the same against lateral movement on said annuli and counterbalancing means forming a part of said interconnection between at least one of said annuli and said body part.

2. A supporting cell for an optical element which is to be adjustable in attitude comprising a main body part adapted to receive said element, a pair of concentrically related annuli of different diameters selected in accordance with the size of said element interconnected with said body part and against which one side of said element is rested in substantially coaxial relation with said annuli, means engaging the edge of said optical element for restraining the same against lateral movement on said annuli and counterbalancing means forming a part of said interconnection between at least one of said annuli and said body part constructed and arranged to respond to changes in attitude of said cell and optical element when supported therein and to cause pressure to be exerted against said optical element by said one of said annuli in opposition to natural forces tending to cause distortion of said element during changes in attitude thereof.

3. A support for an optical element having a critical optical surface on at least one of its sides and which is to be adjustable in attitude comprising a main body part recessed from one side to receive said optical element, a pair of concentrically related annuli of different diameters interconnected with said body part within said recess and against which the opposite side of said optical element is rested in substantially coaxial relation with said annuli, means engaging the edge of said optical element for restraining the same against lateral movement on said annuli while permitting substantially free axial movement of said optical element in said body part toward and away from said annuli and counterbalancing means forming a part of said interconnection between at least one of said annuli and said body part constructed and arranged to respond to changes in attitude of said support in such manner as to cause pressure to be exerted against said opposite side of said optical element by said one of said annuli in opposition to natural forces tending to cause distortion of said element during changes in attitude thereof.

4. A device of the character described for supporting an optical element which is to be adjustable in attitude comprising a main supporting body, a first fixed annulus on said body of a predetermined diameter, a second annulus of a smaller predetermined diameter, means for adjustably interconnecting said second annulus to a part of said main supporting body and for retaining said second annulus in substantially concentric relation with said first annulus, means for holding said optical element in substantially coaxial relation with said annuli when said optical element is seated with one of its sides resting against said annuli, counterweighted lever means forming a part of said interconnecting means arranged to function automatically in accordance with the attitude of said device to apply forces to said second annulus tending to counteract changes in natural forces resulting from the weight of said optical element against said second annulus during changes in attitude of said device.

5. A device of the character described for supporting an optical element having a critical optical surface on at least one of its sides and which is to be adjusted in attitude comprising an annular main supporting body having an integral annular shouldered portion recessed inwardly from one side of said body to a predetermined depth controlled in accordance with the thickness of said optical element, a first fixed annulus on said shouldered portion of a preselected diameter in accordance with the diametrical size of said optical element, a second annulus of a smaller preselected diameter, means for adjustably supporting said second annulus from a part of said main supporting body in substantially concentric relation with said first annulus, means for holding said optical element in substantially coaxial relation with said annuli when said optical element is seated with one of its sides resting against said annuli, and counterweighted lever means forming a part of said adjustable supporting means constructed and arranged to function automatically in accordance with the attitude of said device to apply forces to said second annulus in opposition to natural forces resulting from the weight of said optical element and tending to produce distortion of said critical optical surface thereof.

6. A supporting cell for mounting an optical element which is to be subjected to changes in attitude comprising an annular body part recessed from one side to receive said optical element, a first fixed annulus within said recess formed integral with said body part and to a predetermined diameter in accordance with the diametrical size of said optical element, a second annulus of predetermined smaller diameter than said first annulus, means for holding said second annulus against a side of said optical element and in substantially concentric relation with said first annulus when said side of said optical element is seated against said first annulus, said holding means embodying a lever arm weighted adjacent one end and cooperatively related with said second annulus adjacent its other end, means pivotally connecting said lever arm to said body part at a preselected location intermediate its opposite ends and means for holding said optical element in substantially coaxial relation with said annuli within said body part while permitting substantially free axial movement thereof in said body part.

7. A supporting cell for mounting an optical element which is to be subjected to changes in attitude comprising an annular body member adapted to receive said optical element, a first annulus within said body member formed as an integral part thereof and to a predetermined diameter in accordance with the diametrical size of said optical element, a pressure plate having a second annulus on one of its sides of a predetermined smaller diameter than said first annulus, means for holding said pressure plate with its second annulus normally bearing against a side of said optical element and in substantially concentric relation with said first annulus when said side of said optical element is seated against said first annulus in said body member, said holding means embodying a lever arm weighted adjacent one end and bearing adjacent its opposite end on the other side of said pressure plate, means pivotally connecting said lever arm to said body member at a preselected location intermediate its opposite ends and means for holding said optical element in substantially concentric relation with said annuli within said body member while permitting substantially free axial movement thereof in said body member.

8. A device of the character described for supporting an optical element comprising a body part recessed from one side to a depth and contour size and shape such as to permit placement of said optical element within said body part, a pair of concentrically related annuli within said recess of different precontrolled diametrical dimensions against which one side of said optical element is to be rested when in use, mounting means for said annuli embodying an intermediate annular balancing member having an outer edge diameter at least equal to that of the mean diameter of one of said annuli and an inner edge diameter at least equal to that of the mean diameter of the other of said annuli, flexure means connecting each of said annuli concentrically with and to a first side of said balancing member adjacent said respective inner and outer edges thereof and flexure means connecting the opposite side of said balancing member to said body part at a location thereon between the points of connection of said annuli at said first side of said balancing member.

9. A device of the character described for supporting an optical element comprising a body part recessed from one side to a depth and contour size and shape such as to permit placement of said optical element within said body part, a pair of concentrically related annuli within said recess of different precontrolled diametrical dimensions against which one side of said optical element is to be rested when in use, mounting means for said annuli embodying an intermediate annular balancing member having an outer edge diameter at least equal to that of the mean diameter of one of said annuli and an inner edge diameter at least equal to that of the mean diameter of the other of said annuli, first flexure means connecting each of said annuli concentrically with and to a first side of said balancing member adjacent said respective inner and outer edges thereof, second flexure means connecting the opposite side of said balancing member to said body part at a location thereon between the points of connection of said annuli at said first side of said balancing member and means for holding said optical element in substantially coaxial relation with said annuli within said body part while permitting relatively free axial movement thereof.

10. A supporting cell for mounting an optical element which is to be subjected to changes in attitude comprising an annular body part recessed from one side to receive said optical element, a first fixed annulus within said recess and formed integral with said body part and to a predetermined diameter in accordance with the diametrical size of said optical element, a pressure plate having a second annulus on one of its sides of a predetermined smaller diameter than said first annulus, means for holding said pressure plate with its second annulus normally bearing against a side of said optical element and in substantially concentric relation with said first annulus when said side of said optical element is seated against said first annulus in said body member, said holding means embodying a lever arm weighted adjacent one end and pivotally connected adjacent its opposite end to the other side of said pressure plate, means pivotally connecting said lever arm to said body part at a preselected location intermediate its opposite ends, holding means fitted against the edge of said optical element and adjustably pivotally connected to said body part for centering and holding said optical element in substantially concentric relation with said annuli when said element is within said body part while affording said optical element freedom of movement axially in said body part.

11. A supporting cell for a circular optical element having a critical optical surface on at least one of its sides comprising an annular main body part adapted to receive said optical element internally thereof, a pair of concentrically related annuli of different diameters interconnected with said body part and against which the opposite side of said element is seated when in a position of use, holding means fitted against the edge of said optical element and adjustably pivotally connected to said body part for centering and holding said optical element in substantially coaxial relation with said annuli while affording said optical element freedom of movement axially in said body part, means forming a part of said interconnection between at least one of said annuli and said body part which is constructed and arranged to react to changes in attitude of said cell by exerting a force in an amount according to the attitude condition of said cell against said annulus connected thereto and by means of which said force is applied to said element to counteract natural forces tending to cause distortion of said element as a result of its weight being directionally shifted during attitude changes thereof.

12. The method of mounting an optical element which is to be subjected to changes in attitude comprising placing one side of said element against a pair of concentrically related annuli of different precontrolled diameters selected in accordance with the diameter of said optical element, aligning and holding said optical element in coaxial relation with said annuli while permitting relatively free axial movement of said optical element, applying forces to at least one of said annuli in amounts which are automatically variable and controlled in accordance with the attitude of said optical element to counteract natural forces tending to distort said optical element as a result of the weight of said element being directionally shifted during said attitude changes.

13. The method of supporting an optical element which is to be subjected to changes in attitude comprising supporting at least the major portion of the weight-load of said optical element upon a pair of substantially concentrically related annuli of different diametrical sizes selected in accordance with the distribution of said weight-load desired upon each of said annuli, applying pressure to at least one of said annuli of an amount controlled automatically by the attitude of said optical element to counterbalance natural forces tending to distort said optical element as a result of its weight being directionally shifted during said attitude changes.

14. The method of supporting an optical element which is to be subjected to changes in attitude comprising supporting at least the major portion of the weight-load of said optical element upon a pair of substantially concentrically related annuli of different diametrical sizes selected in accordance with the distribution of the weight-load desired upon each of said elements, holding said optical element in substantially coaxial relation with said annuli substantially without constraint of axial movement of said optical element, applying pressure to at least one of said annuli automatically and of an amount which is controlled by the attitude of said optical element to counterbalance natural forces tending to distort said optical element as a result of its weight being directionally shifted during said attitude changes thereof.

References Cited in the file of this patent
UNITED STATES PATENTS 2,907,247    Gibson _____ Oct. 6, 1959